United States Patent [19]
Bruner et al.

[11] Patent Number: 6,141,206
[45] Date of Patent: Oct. 31, 2000

[54] SWITCHGEAR ASSEMBLY WITH NOVEL ARRANGEMENT FOR CONNECTING A TIE OR MAIN CIRCUIT BREAKER

[75] Inventors: Rodney William Bruner; William Edward Wilkie, II, both of Fletcher, N.C.

[73] Assignee: Eaton Corporation, Cleveland, Ohio

[21] Appl. No.: 09/261,882

[22] Filed: Mar. 3, 1999

[51] Int. Cl.[7] .................................................. H02B 5/00
[52] U.S. Cl. .......................... 361/605; 361/611; 361/624; 361/637; 361/639; 361/648; 361/650; 174/71 B; 174/88 B
[58] Field of Search .................................... 361/601, 605, 361/611, 614, 620, 624, 637, 639, 648, 650; 174/88 B, 88 R, 72 B, 71 B, 99 B, 129 B

[56] References Cited

U.S. PATENT DOCUMENTS

| | | | |
|---|---|---|---|
| 2,997,627 | 8/1961 | Ellegood | 361/614 |
| 3,349,291 | 10/1967 | Olashaw | 361/624 |
| 3,793,564 | 2/1974 | Salvati et al. | 361/361 |
| 4,121,276 | 10/1978 | Kovatch et al. | |
| 4,178,624 | 12/1979 | Wilson et al. | 361/611 |
| 4,307,304 | 12/1981 | Kovatch et al. | 361/611 |
| 4,366,528 | 12/1982 | Cole | 361/831 |
| 4,822,951 | 4/1989 | Wilson et al. | |
| 5,949,641 | 9/1999 | Walker et al. | 361/600 |

OTHER PUBLICATIONS

Cutler–Hammer, *Type DSII Metal–Enclosed Low–Voltage Switchgear*, Feb. 1997, 43 pp.

*Primary Examiner*—Leo P. Picard
*Assistant Examiner*—Boris L. Chervinsky
*Attorney, Agent, or Firm*—Martin J. Moran

[57] ABSTRACT

Main circuit breakers and/or tie circuit breakers are connected by upper and lower disconnects to upper and lower sections, respectively, of split risers in a low voltage switchgear assembly. An upper horizontal bus is connected to the upper sections of the split risers while a lower horizontal bus is connected to the lower sections. However, with the main or tie breaker mounted in the "C" position of a switchgear section, the gap between the upper and lower sections of the split risers is positioned vertically such that one of the phase conductors of the lower horizontal bus is above the gap. A unique connector extends downward from this phase conductor and is connected to the corresponding phase of the lower section of the vertical bus through the lower stab which engages the lower disconnect for the main or tie breaker.

11 Claims, 3 Drawing Sheets

SWITCHGEAR ASSEMBLY WITH NOVEL ARRANGEMENT FOR CONNECTING A TIE OR MAIN CIRCUIT BREAKER

BACKGROUND OF THE INVENTION

1. Field of the Invention

This invention relates to switchgear used in electric power distribution systems, and particularly to a switchgear assembly housing a three-phase tie or main circuit breaker and to the arrangement for connecting the circuit breaker to upper and lower horizontal buses in the switchgear assembly.

2. Background Information

Switchgear assemblies typically include a series of metal cabinets or sections housing electrical apparatus and associated conductors for connecting the electrical apparatus in an electric power distribution system. The electrical apparatus can include electrical switches such as circuit breakers and network protectors which provide protection, disconnect switches for isolating parts of the electric power distribution system and transfer switches for transferring between alternate power sources. The electrical apparatus can also include measuring and instrumentation equipment. Switchgear operating at voltages up through 600 volts are categorized as low voltage switchgear.

Often low voltage switchgear assemblies are configured with substation transformers connected on both ends of the switchgear assembly through main breakers. The purpose of this configuration is to provide multiple power sources to the switchgear in the event one of the sources fails. A tie breaker is placed in the center of the line-up to provide the transition of power from one source to the other. The main and tie circuit breakers are often interlocked either electrically or mechanically such that both mains and the tie breaker cannot be closed simultaneously. Thus, one of two operating conditions exist: 1) both main circuit breakers are closed and the tie circuit breaker is open, thus the switchgear assembly is fed via two sources, or 2) one main circuit breaker is closed, the other main circuit breaker is open and the tie circuit breaker is closed so that the entire switchgear assembly is fed from one source.

A typical section of a switchgear assembly is equipped to provide four vertically stacked positions for circuit breaker or instrumentation mounting. The top position is labeled "A", second from the top is labeled "B", third from top is "C" and the bottom is defined as "D". In existing switchgear assemblies of the assignee of this invention, the placement of tie circuit breakers is exclusively in the B position. The tie circuit breaker in this arrangement is fed strictly through the vertical bus via horizontal main buses on both sides. To accommodate this arrangement, the vertical bus or risers is split with the upper and lower sections connected to separate horizontal buses to force the primary current path through the tie circuit breaker. Thus, the upper main horizontal bus is connected to the upper disconnects of the tie circuit breaker while a lower main horizontal bus is connected to the lower disconnects. Due to the placement of the main bus taps (the connectors from the vertical bus to the horizontal main bus) the B location provides the logical position for the vertical bus split. In this position, the upper main horizontal bus is above the stabs which connect the upper section of the vertical bus to the upper disconnects on the tie circuit breaker, and the lower main horizontal bus is below the stabs which connect the lower sections of the vertical bus to the lower disconnects.

While the most common arrangement for main circuit breakers in a low voltage switchgear assembly is to connect the upper disconnects to the utility lines through cabling connected to runbacks and to connect the load side to a vertical bus which extends the full height of the cabinet, in the arrangement discussed above where main circuit breakers are provided on both ends of the switchgear assembly often the main circuit breakers are each mounted in the "B" position and connected to the upper and lower sections of an associated split vertical bus.

Placing the main or tie circuit breakers in the "B" position has some limitations. First, depending upon the number of feeder circuits between the main and the tie circuit breakers, an additional switchgear section might be needed just to accommodate the required feeder circuits so that an equal number of circuits are connected on both sides of the tie circuit breaker. Secondly, associated metering and control devices are typically mounted above the circuit breakers. Placing the circuit breakers in the "B" position only leaves the "A" position for this purpose. This is especially a problem for the main circuit breakers which usually require more metering than the other circuit breakers.

There is a need, therefore, for improved switchgear assemblies, and particularly to an improved arrangement in switchgear assemblies for mounting tie circuit breakers and main circuit breakers.

SUMMARY OF THE INVENTION

This need and others are satisfied by the invention which is directed to switchgear assemblies which accommodate the mounting of electrical apparatus such as main circuit breakers and tie circuit breakers in the "C" position in a switchgear section or cabinet. This location of the main or tie circuit breaker represents a challenge because moving the split in the vertical bus or risers down to the "C" position results in one of the phase conductors of the lower horizontal main bus being above the split in the vertical bus.

This problem is addressed by the invention which is directed to a switchgear assembly including a cabinet with a forward compartment. A set of risers comprising a plurality of laterally spaced vertical phase conductors extends vertically behind the front compartment. The set of risers has an upper section and a lower section spaced from the upper section by a gap. An electrical switching apparatus, such as a main circuit breaker or a tie circuit breaker, is mounted in the forward compartment. Means are provided for connecting an upper set of disconnects on the electrical switching apparatus to the upper section of the set of risers while additional means are provided for connecting a lower set of disconnects on the electrical switching apparatus to the lower section of the set of risers.

A first transverse bus has a plurality of first horizontal phase conductors extending across the compartment, all above the gap in the set of risers, and each connected to a corresponding vertical phase conductor of the upper section of the set of risers. A second transverse bus has a plurality of second horizontal phase conductors extending across the compartment behind the set of risers with all of the second horizontal phase conductors but one below the gap and connected to a corresponding one of the vertical phase conductors in the lower section of the set of risers. The one second horizontal phase conductor extends horizontally across the compartment above the gap in the risers. A connector connects this one second horizontal phase conductor above the gap to a corresponding vertical phase conductor in the lower section of the set of risers below the gap.

The connector comprises at least one flat connecting conductor engaging and extending downward from the one second horizontal phase conductor above the gap, and a bracket assembly connecting the lower end of this flat connecting conductor to the corresponding vertical phase conductor in the lower section of the risers. Typically, the one second horizontal phase conductor is formed of a plurality of flat horizontal conductors set on edge and the flat connecting conductor which may also comprise a number of flat conductors is interleaved with the flat horizontal conductors.

The bracket assembly comprises either a pair of flat coupling conductors set on edge and connected to extensions on the stab elements between the vertical phase conductor and the associated lower disconnect on the electrical apparatus in terminating transverse flanges which engage the lower end of the flat downwardly extending connecting conductors. Alternatively, the coupling conductors can be integral extensions on the stab conductors.

An electrically insulating member is provided between the one second horizontal phase conductor which is above the gap and the vertical phase conductors of the upper section of the set of risers, and particularly where this one second horizontal phase conductor is above the stabs connecting the upper section of the vertical risers to the upper disconnects on the electrical apparatus. In some applications, the stabs may even have rearwardly extending heat sinks which must be separated from the flat connecting conductors by the electrically insulating member.

BRIEF DESCRIPTION OF THE DRAWINGS

A full understanding of the invention can be gained from the following description of the preferred embodiments when read in conjunction with the accompanying drawings in which.

DESCRIPTION OF THE PREFERRED EMBODIMENTS

Figure 1:
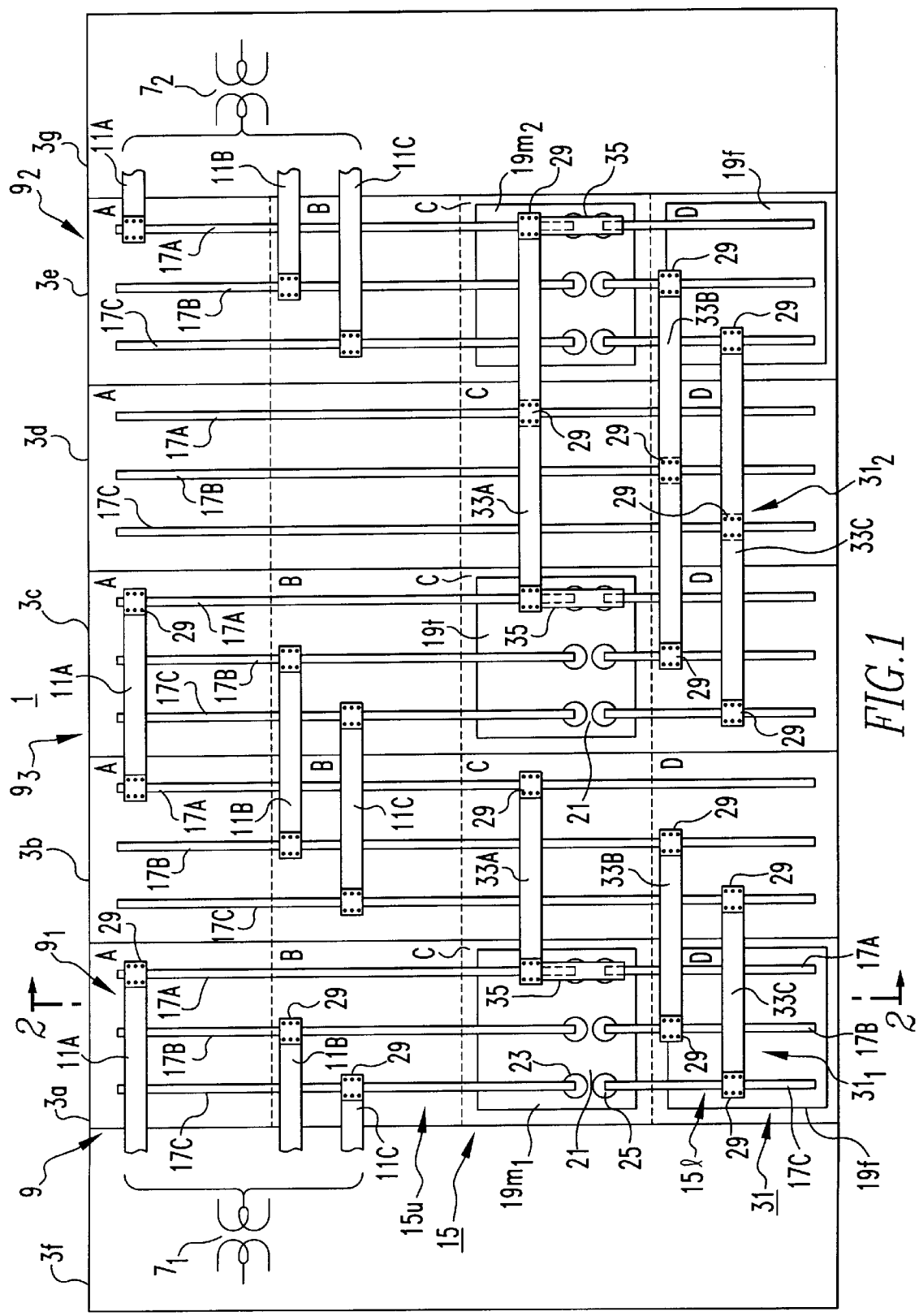
FIG. 1 is a partially schematic elevation view through a switchgear assembly incorporating the invention.
Figure 2:
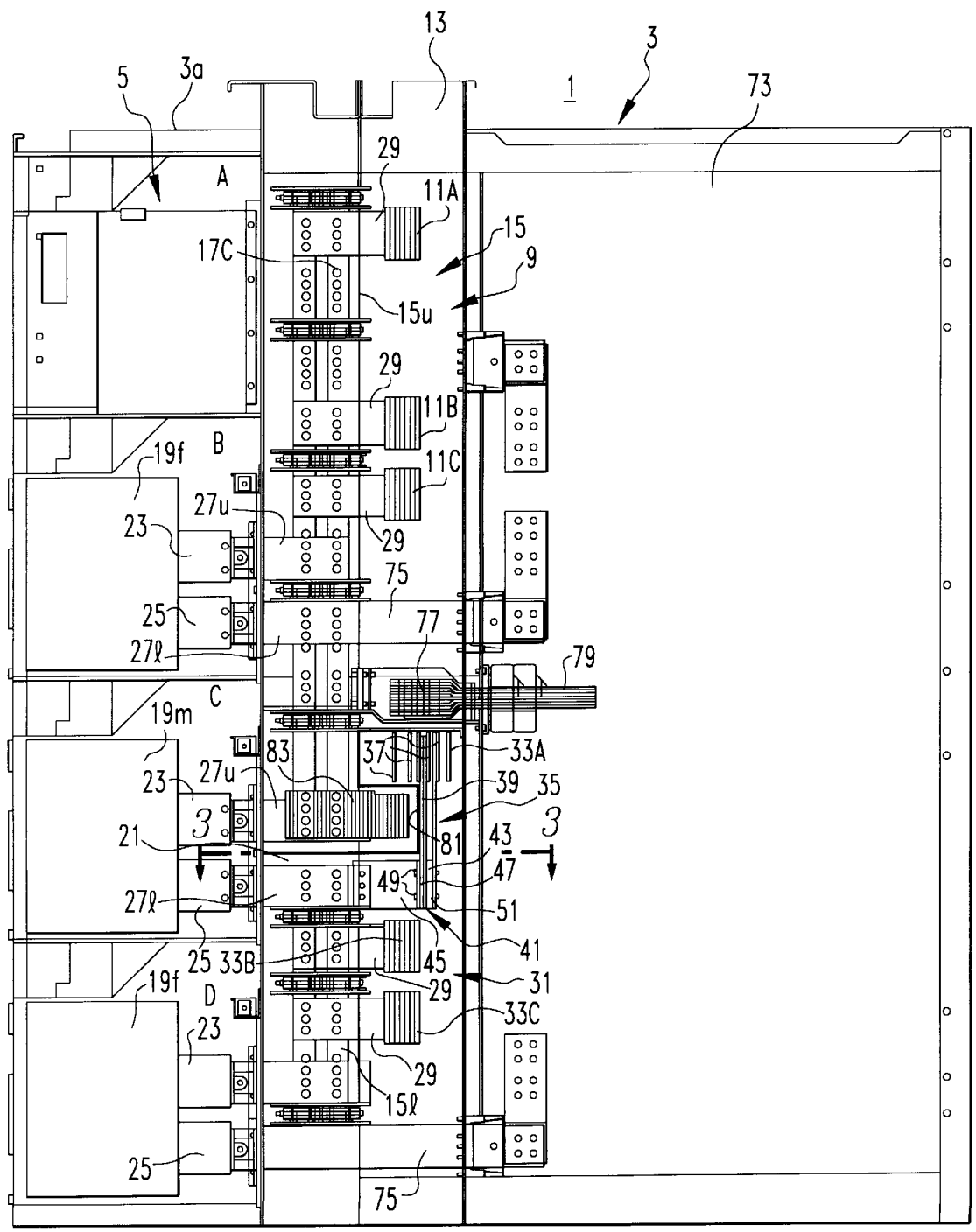
FIG. 2 is a front to rear sectional view through the switchgear assembly of FIG. 1.

Referring to FIGS. 1 and 2, a low voltage switchgear assembly 1 includes a number of cabinets or sections 3a–3e mounted side-by-side. As best seen in FIG. 2, each of these sections 3a–3e has a forward compartment 5 divided vertically to form four stacked positions A, B, C and D.

The switchgear assembly 1 illustrated includes end sections or cabinets 3f and 3g each of which includes a substation transformer $7_1$ and $7_2$, respectively, through which the switchgear assembly 1 can be fed at both ends. An upper or first transverse bus 9 has three sections. A first section $9_1$ is connected to the secondary of the substation transformer $7_1$. A second section $9_2$ is connected to the secondary of the substation transformer $7_2$ and a middle section $9_3$. Each of the sections of this upper transverse bus include horizontal phase conductors 11A, 11B and 11C. Each switchgear section 3 includes in a middle compartment 13 (see FIG. 2) a vertical bus or set of risers 15 each formed by vertical phase conductors 17A, 17B and 17C.

As can be seen in FIG. 1, section 3a of the switchgear assembly 1 houses in position C a first main circuit breaker $19m_1$ which connects the switchgear assembly 1 to the first source through the transformer $7_1$. Similarly, the section 3e houses a second main circuit breaker $19m_2$ in its position C connecting the switchgear assembly 1 to the second source through the transformer $7_2$. A tie circuit breaker 19t is mounted in position C in the center section 3c of the switchgear. In these three sections 3a, 3c and 3e, the vertical bus or risers 15 are separated by a gap 21 into an upper section 15u and a lower section 15l.

As best seen in FIG. 2, the circuit breakers 19 have on their rear face an upper or first set of disconnects 23 and a lower or second set of disconnects 25. In the C positions of the sections 3a, 3c and 3e, an upper set of stabs 27u connected to the upper vertical phase conductors 17u engage the upper disconnects of the main and tie circuit breakers while lower stabs 27l connect the lower section 15l of the risers to the circuit breaker through the lower disconnects 25.

The horizontal phase conductors 11A, 11B and 11C of the first section $9_1$ of the upper transverse bus are connected to the respective vertical phase conductors 17A, 17B and 17C of the upper section 15u of the vertical bus 15 in switchgear section 3a by conventional main bus taps 29. In like manner, the horizontal phase conductors of the second section $9_2$ of the upper transverse bus 9 are connected to the corresponding vertical phase conductors of the upper section of the vertical bus $15_u$ in the switchgear section 3e by main bus taps 29. The center section $9_3$ of the upper horizontal bus has similar main bus taps 29 connecting corresponding phase conductors 17 of the risers 15 in the sections 3b and 3c together.

A second or lower transverse bus 31 has a first section $31_1$ and a second section $31_2$. Each of these sections of the lower transverse or horizontal bus have horizontal phase conductors 33A, 33B and 33C. Two of the horizontal phase conductors 33B and 33C of the two sections of the lower transverse bus 33 are positioned below the gap 21 in the vertical buses in the sections 3a, 3c and 3e while one of the horizontal phase conductors 31A of this lower transverse bus 31 are positioned above the gap 27. The horizontal phase conductors 31B and 31C are connected to corresponding phase conductors in the lower sections 15l in switchgear sections 3a, 3c and 3e by the conventional main bus taps 29. The opposite ends of the horizontal phase conductors 33B and 33C of the first section $31_1$ of the lower transverse bus are similarly connected to the corresponding vertical phase conductors 17 in the switchgear section 3b by main bus taps 29. Such main bus taps 29 also connect the horizontal phase conductors 33B and 33C of the section $31_2$ to vertical phase conductors 17B and 17C in the section 3d.

As the one or A horizontal phase conductor 33A of the lower transverse bus 31 is above the gap 21, a connector 35 is provided in accordance with the invention to connect this phase conductor to the corresponding A phase conductor 17A in the lower section 15l of the vertical bus 15. This is shown in FIG. 1 where the left end of the phase conductor 33A of the section $31_1$ is connected by a connector 35 to the vertical phase conductor 17A in the lower section 15l of the section 3a of the switchgear assembly. Similarly, each end of the one horizontal phase conductor 33A in the second section $31_2$ of the lower transverse bus is connected to the A phase vertical conductor 17A in the switchgear sections 3c and 3e by additional connectors 35.

Figure 3:
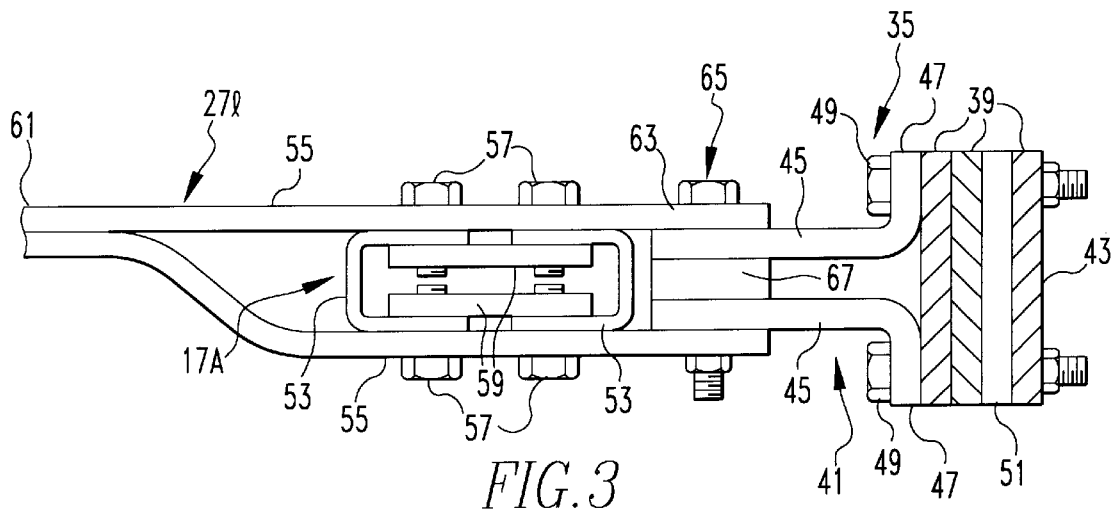
FIG. 3 is a fractional sectional view through the switchgear assembly taken along the line 3—3 in FIG. 2.

The details of the connectors 35 can be more easily understood by reference to FIG. 3 in addition to FIGS. 1 and 2. As can be seen from FIG. 2, the one horizontal phase conductor 33A of the lower transverse bus 31 is made up of a plurality of flat conductors 37 set on edge and spaced apart horizontally. The number and cross sections of these flat conductors 37 is determined by the current capacity required of the bus. The connector 35 includes one or more flat connecting conductors 39 interleafed with and extending downward from the flat conductors 37 of the horizontal phase conductor 33A and a bracket assembly 41 connecting the lower end of the flat connecting conductors 39 to the corresponding phase A vertical conductor 17A of the lower section of the set of risers 15l. In the embodiment of FIG. 3, the bracket assembly 41 is formed by a pair of flat coupling conductors 45 set on edge and terminating in outwardly directed transverse flanges 47 which are secured to the lower ends 43 of the connecting conductors 39 by bolts 49. A spacer plate 51 equal in thickness to one of the flat conductors 37 maintains separation between the connecting conductors 39.

The coupling conductors 45 of the bracket assembly 41 are secured to the vertical phase conductors 17 of the lower section of the risers 15l through the associated lower stab 27l. As can be appreciated from FIG. 3, the exemplary vertical phase conductor 17A is formed by two spaced apart, confronting, C-shaped channels 53. The stab 27l comprises a pair of flat stab elements 55 which straddle the C-channels 53 and are secured thereto by bolts 57 which engage tapped holes in backing plates 59. The forward ends 61 of the stab elements 55 converge to form the stab connection which is engaged by the lower disconnects 25 on the circuit breakers 19. The rearward ends of the stab elements 55 extend beyond the C-channels 53 and overlap the forward ends of the coupling conductors 45 which are secured thereto by bolts 65 which also pass through a spacer 67 between the coupling conductors.

Figure 4:
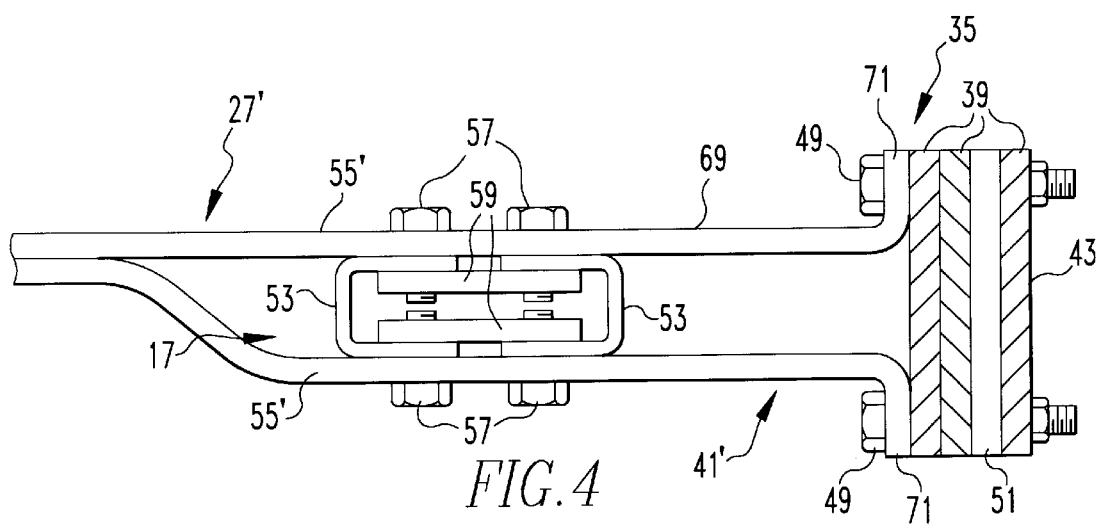
FIG. 4 is an alternate arrangement for the portion of the switchgear assembly shown in FIG. 3.

In an alternate arrangement shown in FIG. 4, the bracket assembly 41' is formed by extension 69 on the rearward ends of the stab elements 55' which terminate in outwardly directed transverse flanges 71 secured to the lower ends 43 of the flat connecting conductors 39 by the bolts 49.

Returning to FIG. 1, with the main circuit breakers $19m_1$ and $19m_2$ mounted in the C positions of the switchgear sections 3a and 3e, the A and B positions in these sections above them are available for instrumentation. Feeder circuit breakers 19f can be mounted in the D positions in each of these sections 3a–3e (only shown in 3a and 3e). Additional feeder circuit breakers (not shown) can be mounted in the B and C positions of the sections 3b and 3d as well as the B position in section 3c above the tie circuit breaker 19t in the C position. As is common, instrumentation can be installed in the A positions of the sections 3b–3d. Thus, it can be seen that by placing the main circuit breakers and the tie circuit breaker in the C position in equal number of feeder circuit breakers (5 in the example) can be mounted between each of the main circuit breakers and the tie circuit breakers. On the other hand, if the main circuit breakers and the tie circuit breakers are moved up to the B positions and only the A positions are available for instrumentation, the positions for feeder circuit breakers on either side of the tie breaker becomes unbalanced with five positions on the left and seven positions on the right. Also, only one position is available above the main and tie circuit breakers for instrumentation.

As can be seen from FIG. 2, each section 3 of the switchgear assembly 1 is divided into the forward compartment 5 housing the circuit breakers 19 and the instrumentation (not shown), the middle compartment 13 in which the risers 15 and the upper and lower horizontal buses 9 and 31 are located, and a rear compartment 73. The rear compartment houses cabling (not shown) which is connected to the lower disconnects 25 on the feeder circuit breakers by runbacks 75. As can also be seen in FIG. 2, a common neutral conductor 77 extends horizontally across the middle compartment 13 at about mid-height. An extension 79 on the neutral bus projects into the rear compartment 73. In order to provide electrical isolation between the upper section of the vertical bus 15u and the one horizontal phase conductor 33A of the lower horizonal bus 31, an insulating member 81 extends between the horizontal phase conductor 33A and the neutral conductor 77, the corresponding vertical phase conductor 17 of the upper section 15u of the risers and the upper stab 27u at the lower end of the vertical riser of the upper section. Optionally, a heat sink 83 such as is described in commonly owned patent application Ser. No. 09/222,151, filed on Dec. 29, 1998, extends rearward from the upper stab but is also isolated from the horizontal phase conductor 33A and the connecting conductors 39 by the insulating member 81.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of invention which is to be given the full breadth of the claims appended and any and all equivalents thereof.

What is claimed is:

1. A switchgear assembly comprising:

a cabinet having a forward compartment;

a set of risers comprising a plurality of laterally spaced, vertical phase conductors extending vertically behind the forward compartment, said set of risers having an upper section and a lower section spaced from the upper section by a gap;

an electrical switching apparatus mounted in said forward compartment and having an upper set of disconnects and a lower set of disconnects;

means connecting said upper disconnects to said upper section of said set of risers;

means connecting said lower disconnects to said lower section of said vertical risers;

a first transverse bus having a plurality of first horizontal phase conductors extending horizontally across said cabinet across said risers and all above said gap, and each connected to a corresponding vertical phase conductor of said upper section of said set of risers;

a second transverse bus having a plurality of second horizontal phase conductors extending horizontally across said set of risers with all of said second horizontal phase conductors but one below said gap and connected to a corresponding one of said vertical phase conductors in said lower section of said risers, and said one second horizontal phase conductor extending horizontally across said set of risers above said gap; and a connector connecting said one second horizontal phase conductor extending horizontally above said gap to a corresponding phase conductor in said lower section of said set of risers below said gap.

2. The switchgear assembly of claim 1 wherein said connector comprises at least one flat connecting conductor engaging and extending downward from said one second horizontal phase conductor, and a bracket assembly connecting a lower end of said at least one flat connecting conductor to said corresponding vertical phase conductor in said lower section of said risers.

3. The switchgear assembly of claim 2 wherein said one second horizontal phase conductor comprises a plurality of flat horizontal conductors set on edge, said at least one flat connecting conductor being interleaved with said plurality of flat horizontal conductors.

4. The switchgear assembly of claim 3 wherein said connector comprises a number of flat connecting conductors interleaved with said plurality of flat horizontal conductors.

5. The switchgear assembly of claim 4 wherein said means connecting said lower disconnects on said electrical switching apparatus to said corresponding vertical phase conductors in said lower section of said risers comprises lower stab conductors comprising a pair of flat stab elements straddling a corresponding vertical phase conductor in said lower section of said risers, and said bracket assembly includes extensions on said flat stab elements associated with said corresponding vertical phase conductor extending rearward beyond said corresponding vertical phase conductor and a pair of flat coupling conductors extending rearwardly from said extensions on said flat stab elements and terminating in transverse flanges connected to a lower end of said connecting conductors.

6. The switchgear assembly of claim 2 wherein said bracket assembly comprises a pair of flat coupling conductors set on edge and connected to said corresponding vertical phase conductor and terminating in transverse flanges engaging said lower end of said at least one flat connecting conductor.

7. The switchgear assembly of claim 6 wherein said means connecting said lower disconnects on said electrical switching apparatus to said vertical phase conductors of the risers comprises a pair of flat stab elements straddling said corresponding vertical phase conductor of the lower section of said risers and said coupling conductors being integral with said flat stab elements.

8. The switchgear assembly of claim 1 including an electrical insulating member extending between said one second horizontal phase conductor and said upper section of said risers.

9. The switchgear assembly of claim 8 wherein said one second horizontal phase conductor is positioned above said means connecting said upper disconnects to said vertical phase conductors of said upper section of said risers and said electrical insulating member extends between said one second horizontal phase conductor and connector on one side and said means connecting said upper disconnects to said upper sections of said vertical phase conductors on the other side.

10. The switchgear assembly of claim 1 wherein said electrical switching apparatus comprises a tie circuit breaker.

11. The switchgear assembly of claim 1 wherein said electrical switching apparatus comprises a main circuit breaker.

* * * * *